US006957200B2

(12) United States Patent
Buczak et al.

(10) Patent No.: US 6,957,200 B2
(45) Date of Patent: Oct. 18, 2005

(54) GENOTIC ALGORITHM OPTIMIZATION METHOD AND NETWORK

(75) Inventors: Anna L. Buczak, Croton-On-Hudson, NY (US); Henry Wang, Piscataway, NY (US)

(73) Assignee: Honeywell International, Inc., Morristown, NJ (US)

(*) Notice: Subject to any disclaimer, the term of this patent is extended or adjusted under 35 U.S.C. 154(b) by 617 days.

(21) Appl. No.: 09/893,108

(22) Filed: Jun. 27, 2001

(65) Prior Publication Data

US 2003/0050902 A1 Mar. 13, 2003

Related U.S. Application Data

(60) Provisional application No. 60/282,366, filed on Apr. 6, 2001.

(51) Int. Cl.[7] .................................................. G06F 15/18
(52) U.S. Cl. .......................................................... 706/13
(58) Field of Search ............................................ 706/13

(56) References Cited

U.S. PATENT DOCUMENTS

| | | | | | |
|---|---|---|---|---|---|
| 4,935,877 | A | * | 6/1990 | Koza | 706/13 |
| 5,148,513 | A | * | 9/1992 | Koza et al. | 706/13 |
| 5,343,554 | A | * | 8/1994 | Koza et al. | 706/13 |
| 5,465,218 | A | | 11/1995 | Handa | 716/8 |
| 5,479,523 | A | | 12/1995 | Gaborski et al. | 382/159 |
| 5,541,848 | A | * | 7/1996 | McCormack et al. | 700/213 |
| 5,719,794 | A | | 2/1998 | Altshuler et al. | 703/1 |
| 5,742,738 | A | * | 4/1998 | Koza et al. | 706/13 |
| 5,777,948 | A | | 7/1998 | Ferkinhoff et al. | 367/131 |
| 5,778,317 | A | | 7/1998 | Kaminsky | 455/450 |
| 5,793,931 | A | | 8/1998 | Hillis | 706/13 |
| 5,970,487 | A | * | 10/1999 | Shackleford et al. | 707/6 |
| 6,006,604 | A | | 12/1999 | Rabelo et al. | 73/290 R |
| 6,055,523 | A | | 4/2000 | Hillis | 706/13 |
| 6,067,409 | A | | 5/2000 | Scepanovic et al. | 716/8 |
| 6,112,126 | A | | 8/2000 | Hales et al. | 700/29 |
| 6,215,771 | B1 | * | 4/2001 | Turner et al. | 370/235 |
| 6,505,180 | B1 | * | 1/2003 | Crowley | 706/13 |
| 6,714,923 | B2 | * | 3/2004 | Crowley | 706/13 |

OTHER PUBLICATIONS

Buczak, A. et al., "Self–Organization of a Heterogeneous Sensor Network by Genetic Algorithms", *Intelligent Engineering Systems Through Artificial Neural Networks*, vol. 8, pp. 259–264, ASME Press, 1998.

Buczak, A. et al., "Genetic Algorithm Based Sensor Network Optimization for Target Tracking", *Intelligent Engineering Systems Through Artificial Neural Networks*, vol. 9, pp. 349–354, ASME Press, 1999.

Buczak, A. et al., "Study on Genetic Algorithm Convergence for Sensor Network Optimization Problem" *Proceedings of the Fifth Joint Conference on Information Sciences*, pp. 1035–1039, 2000.

(Continued)

*Primary Examiner*—George B. Davis
(74) *Attorney, Agent, or Firm*—Schwegman, Lundberg, Woessner & Kluth, P.A.

(57) ABSTRACT

Sensors are selected from a sensor network for tracking of at least one target. The sensors are selected using a genetic algorithm construct having n chromosomes, wherein each chromosome represents one sensor, defining a fitness function based on desired attributes of the tracking, selecting one or more of the individuals for inclusion in an initial population, executing a genetic algorithm on the initial population until defined convergence criteria are met, wherein execution of the genetic algorithm has the steps of choosing the fittest individual from the population, choosing random individuals from the population and creating offspring from the fittest and randomly chosen individuals. In one embodiment, only i chromosomes are mutated during any one mutation, wherein i has a value of from 2 to n−1.

54 Claims, 10 Drawing Sheets

OTHER PUBLICATIONS

Buczak, A. et al., "Genetic Algorithm Convergence Study for a Multi–Model Fitness Function", *Intelligent Engineering Systems Through Artificial Neural Networks*, vol. 10, pp. 265–272, ASME Press, 2000.

Burne, R., et al., "A Self–Organizing, Cooperative Sensor Network for Remote Surveillance: Improved Target Tracking Results", *Proceedings of Conf. On Enabling Technologies for Law Enforcement*, SPIE vol. 4232, pp. 313–321, 2001.

Burne, R. et al., "A Self–Organizing, Cooperative Sensor Network for Remote Surveillance: Current Results", *Proceedings of SPIE 13$^{th}$ International Symposium on AeroSense, Conference 3713 "Unattended Ground Sensor Technologies and Supplications"*, Orlando, Florida, 1999.

* cited by examiner

GENOTIC ALGORITHM OPTIMIZATION METHOD AND NETWORK

This application claims priority to U.S. Provisional Application Ser. No. 60/282,366, filed on Apr. 6, 2001, entitled GENETIC ALGORITHM OPTIMIZATION METHOD, the disclosure of which is incorporated by reference herein in its entirety.

FIELD OF THE INVENTION

The invention pertains generally to improved optimization methods. Specifically, the invention pertains to genetic algorithms and is applicable to optimizing highly multi-modal and deceptive functions, an example of which is choosing individual sensors of a network of sensors to be utilized in tracking a particular target.

BACKGROUND OF THE INVENTION

Optimization of highly multi-modal and deceptive functions with multiple independent variables is very time consuming due to large search spaces and multiple optima that the functions exhibit. Generally, the more independent variables the functions have, the more difficult the optimization process tends to be.

Functions that are especially difficult to optimize generally share certain characteristics including: multi-modality, non-differentiability, discontinuities, feature-type (non-ordered) variables, and a large number of independent variables. Classical mathematical examples of such functions include for example, Rastringin's function, deceptive functions, Holland's Royal Road function.

There are also numerous practical situations in which the problem is represented by a highly multi-modal and/or deceptive function. Examples of such practical situations include, the choice of routers in computer/wireless networks, organization of transistors on chips, biocomputing applications such as protein folding and RNA folding, evolvable hardware, job-shop scheduling and maintenance scheduling problems, timetabling, tracking of targets by sensor networks, sensor deployment planning tools and the control and management of networks of sensors. The control and management of a network of sensors will be considered further as an exemplary massively multi-modal practical problem.

Unattended ground sensors ("UGSs") can greatly add to the effectiveness and capability of military operations. Most commercially available UGSs are multi-functional, integrated sensor platforms that operate independently. An example of an UGS is an acoustics UGS, made up of three acoustic microphones (for accurate bearing angle measurements), a seismic transducer, a magnetic sensor, a global positioning sensor, an orienting sensor, integrated communications and signal processing electronics, and a battery. Such a platform is generally about 1 $ft^3$ (28,320 $cm^3$), and is quite expensive. Because of these disadvantages, they are generally not used to support remote surveillance applications for small, rapidly deployable military operations.

An alternative to these relatively bulky, expensive sensor platforms is to use miniature, about 2 $in^3$ (about 33 $cm^3$) UGSs that are inexpensive and easily deployed by a single war fighter. Smaller sensors, such as those utilized in these miniature UGSs, generally have a shorter range of communications and target sensing, and may only be able to sense a single target characteristic (e.g. a seismic vibration or a chemical detection). Further, smaller sensors generally have a shorter operating life because of smaller batteries. Because of these characteristics, many more of these small UGSs would have to be deployed to accomplish the same goal as their larger counterparts. However, individual miniature UGSs functioning alone would be incapable of carrying out the surveillance objectives.

One alternative to this problem is to "overseed" the surveillance region with these small, low cost UGSs and enable these sensors to organize themselves and work together cooperatively. An UGS network such as this would have a number of advantages not found in more bulky unitary functioning sensors. For example, centrally positioned UGSs can serve as "short-haul" communication relays for the more distant sensors. Many more sensors in a network allow for different types of sensors, which would give the collective operation of the network broader functionality. Also, the built in redundancy present in the network would make it less susceptible to single point failures and/or sensor dropouts.

In order for a network of numerous small, inexpensive UGSs to function acceptably, an algorithm and method to organize and control such a network must be developed. The problem of selecting an optimal set of sensors to detect, track, and classify targets entering a surveillance area while at the same time minimizing the power consumption of the sensor network is considered a multi-objective optimization problem to which there is no unique solution. Furthermore, for a linearly increasing number of targets or sensors, optimization will result in a combinatorial search space that increases exponentially.

U.S. Pat. No. 6,055,523 (Hillis) discloses a method for assigning sensor reports in multi-target tracking with one or more sensors. This method receives sensor reports from at least one sensor over multiple time scans, formulates individuals in a genetic algorithm population as permutations of the sensor report, and then uses standard genetic algorithm techniques to find the path of the tracked object. This method uses a genetic algorithm to determine the path of the tracked object, not to select the sensors or sensor reports to utilize.

Therefore, there exists a need for an improved algorithm that can select individual sensors from a network with the goal of optimizing a number of different variables of performance simultaneously.

SUMMARY OF THE INVENTION

In accordance with the invention there is provided a method for selecting sensors from a sensor network for tracking of at least one target having the steps of defining an individual of a genetic algorithm construct having n chromosomes, wherein each chromosome represents one sensor, defining a fitness function based on desired attributes of the tracking, selecting one or more of the individuals for inclusion in an initial population, executing a genetic algorithm on the initial population until defined convergence criteria are met, wherein execution of the genetic algorithm has the steps of choosing the fittest individual from the population, choosing random individuals from the population and creating offspring from the fittest and randomly chosen individuals.

In accordance with yet another embodiment of the invention there is provided a method for selecting sensors from a sensor network for tracking of at least one target having the steps of defining an individual of a genetic algorithm construct having n chromosomes, wherein each chromosome represents one sensor, defining a fitness function based on desired attributes of the tracking, selecting one or more of the individuals for inclusion in an initial population, executing a genetic algorithm on the population until defined convergence criteria are met, wherein execution of the genetic algorithm has the steps of choosing the fittest individual from the population, and creating offspring from the fittest individual wherein the creation of the offspring occurs through mutation only, wherein only i chromosomes are mutated during any one mutation, and wherein i has a value of from 2 to n−1.

In accordance with yet another embodiment of the invention, there is provided a network of sensors for tracking objects that includes a number, N of sensors, a means for the N sensors to communicate with a controller, and a controller capable of controlling and managing the N sensors by utilizing a method in accordance with the invention.

Preferably, creation of the offspring is accomplished by mutation, crossover or a combination thereof. More preferably, the alteration of the offspring is accomplished by mutation alone.

Preferably, alteration of the offspring occurs at i chromosomes, where i has a value of from 2 to n−1, wherein n is the number of genes that make up a chromosome. More preferably, i has a value of 2.

DETAILED DESCRIPTION OF THE PREFERRED EMBODIMENTS

Device of the Invention

Figure 1:
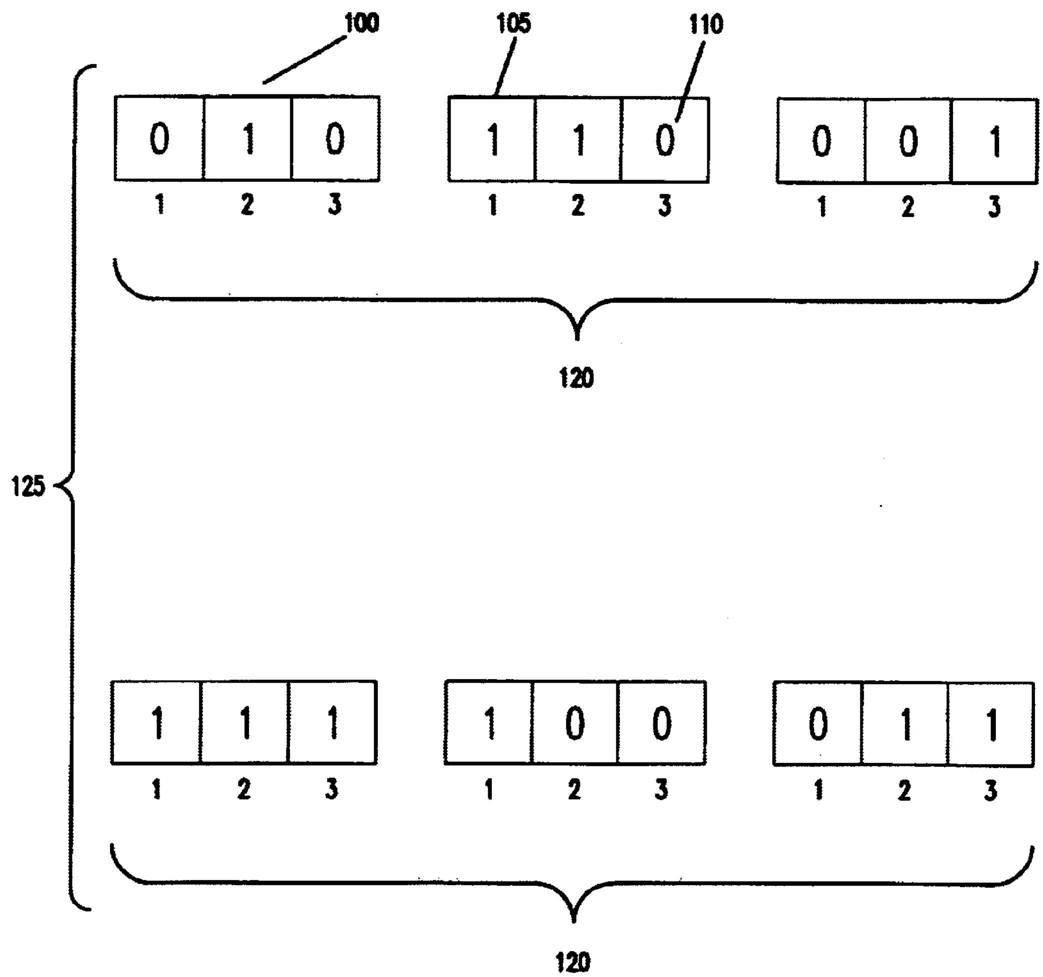
FIG. 1 depicts the general construct of a genetic algorithm's population.

A device in accordance with the invention comprises at least one sensor, a processor, and a genetic algorithm.

The term "entity" will be used throughout the description of the invention. The term entity should be construed broadly to include a number of different electronic items, such as, any sensor that is or can be used for sensing targets, or routers in a computer or wireless network. Entity for example refers generically to any sensor that can be used to detect a characteristic of a target. Examples of such characteristics include speed, location, bearing, type (or identification), size. The invention is not limited to any particular type or number of sensors. Although a preferred embodiment includes small, inexpensive sensors, the term entity as used throughout is not limited thereby. Alternatively, the term entity can also refer to the data received from any type of entity, for example a sensor.

Preferably, a sensor for use with one embodiment of the invention is a sensor that is less than about 2 $in^3$ (about 33 $cm^3$), is inexpensive to produce and run, and can be easily deployed. Such a sensor can be of virtually any type, including but not limited to acoustics, seismic, mechanical, or semiconductor laser. A number of companies are involved with the production of sensors that could be used in one embodiment of the invention, examples of such companies include but are not limited to Northrop-Grumman, SenTech, Raytheon, BAE, Aliant and Rockwell Sciences Center.

The term "network" refers to more than one sensor that can communicate with other sensors and are controlled by one or multiple systems or processors. Some sensors in a network may be unavailable for use for example they are out or range, or their battery is dead), or may simply not be used and are still considered part of the network. Communication between the sensors in a network can be accomplished over wires or through wireless means. A single processor or a number of different processors can control the network, as long as there is a single plan or method for controlling the sensors.

The term "processor" refers to a device or devices that are capable of determining how to control and manage the sensors as well as actually controlling and managing them. Generally, this includes any available processing system that can carry out the necessary steps of the method and control the individual sensors of the network. An example of a processing system that is capable of carrying out the processor function includes, but is not limited to a 500 MHz Compaq laptop computer. It will be appreciated that software programs controlling a programmable computer, hardware-based apparati consisting of general purpose, or custom designed integrated circuit devices, including integrated circuit microprocessors and permanent instructions containing memories may all alternatively implement the method and be part of a device of the invention.

The term "target" refers to the object, animal, or human being tracked. Preferably the target being tracked is an object, such as a land or air vehicle. Generally, the sensors are configured to obtain some type of information about the target. This information can include, but is not limited to the size, identity, speed, and bearing of the target.

The term "sensing" or "sensed" refers to the process of obtaining some information about a target over time. The information obtained from sensing can include, but is not limited to classic tracking, meaning obtaining the location of a target over time. This location is generally 2-dimensional x, y coordinates, or 3 dimensional: x, y, z coordinates. Sensing also includes obtaining other information about the identity, for example some physical characteristic of the target.

Basic Genetic Algorithms

Methods and devices of the invention utilize improved genetic algorithms. In order to understand the improved genetic algorithms, basic genetic algorithms and their terminology will first be discussed.

Genetic algorithms are search algorithms that are based on natural selection and genetics. Generally speaking, they combine the concept of survival of the fittest with a randomized exchange of information. In each genetic algorithm generation there is a population composed of individuals. Those individuals can be seen as candidate solutions to the problem being solved. In each successive generation, a new set of individuals is created using portions of the fittest of the previous generation. However, randomized new information is also occasionally included so that important data are not lost and overlooked.

FIG. 1 illustrates the constructs that genetic algorithms are based on. A basic concept of a genetic algorithm is that it defines possible solutions to a problem in terms of individuals in a population. A chromosome 100, also known as a bit string, is made up of a number of genes 105, also known as features, characters, or bits. Each gene 105 has an allele, or possible value, 110. A particular gene 105 also has a locus or string position 115 that denotes its position in the chromosome 100.

In a functioning genetic algorithm, a chromosome 100 is determined by coding possible solutions of the problem. For example, consider possible routes to reach a particular destination and the time necessary to complete each one. A number of factors will determine how much time any particular route will take, some of these factors include for example: the length of the route, the traffic conditions on the route, the road conditions on the route, and the weather on the route. A chromosome 100 for each route could be constructed by giving each of these factors (or genes 105) a value (or allele 110).

A genotype, also called a structure or individual 120 can be made up of one or more than one chromosome 100. In FIG. 1, a genotype 120 consists of 3 separate chromosomes 100. Applying the same analogy as above, a genotype or individual 120 with more than one chromosome 100 exists if the problem consisted of possible routes for an overall trip containing multiple legs. Each leg of the overall route would have one city (or chromosome 100). A group of individuals 120 constitutes a population 125. The number of individuals 120 in a population 125 (so called population size) depends on the particular problem being solved.

Figure 2:
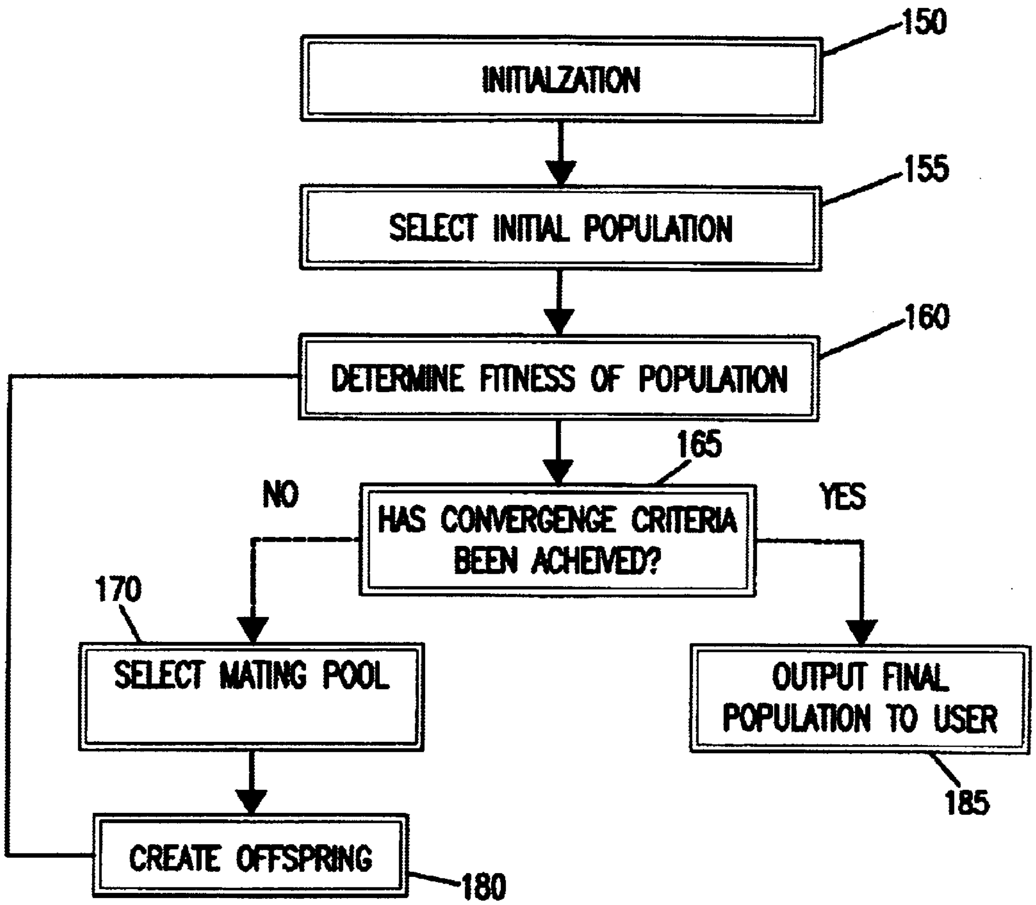
FIG. 2 depicts a generalized flow chart representing steps in a genetic algorithm.

Having explained the construct under which genetic algorithms function, the way in which they function will next be discussed. FIG. 2 depicts the functioning of a genetic algorithm.

The first step is the initialization step 150. Initialization is accomplished by the operator specifying a number of details relating to the way in which the genetic algorithm will function. Details that may need to be specified or chosen at the initialization step 150 include for example, population size, probabilities of certain operators taking place, and expectations for the final solution. The details necessary for initialization depend in part on the exact functioning of the genetic algorithm. The parameters that are chosen at initialization may dictate the time and resources necessary to determine the desired solution using the genetic algorithm. It should also be understood, that the initialization step 150 is optional in that all of the information obtained through the initialization step 150 can be included in the algorithm itself and may not require user input during the initialization step.

The next step in a genetic algorithm is the selection of the initial population step 155. Selection of the initial population is usually accomplished through random selection of individuals 120 but could be accomplished by other methods as well. The number of individuals 120 making up the initial population are determined in part by parameters chosen at the initialization step 150. Generally, a random number generator is used to create the initial population by determining values 110 for each gene 105 in each chromosome 100.

Next, the fitness of the individuals 120 of the randomly selected population is determined in the determination of the fitness step 160. The fitness of an individual 120 is dependent on the particular problem that the genetic algorithm is tasked with optimizing. For example, the fitness may depend on the cost of an individual 120, the effectiveness of an individual 120 for the specified task, or a combination thereof. The fitness of an individual 120 must be able to be measured and determined quantitatively, using a formula for example. Each individual 120 in a population has a specific fitness value.

The next step is the check if the convergence criteria have been achieved step 165. In classic genetic algorithms this is often referred to as checking to see if the fitness of the individuals meets some defined fitness criteria. Generally, in practical applications, the possible or acceptable level of fitness may not be known, so the genetic algorithm is stopped after some number of generations, or after some number of generations where there is no change in the fittest individual for example. In either context, this step checks to see if the requirements, whether a number of generations or a fitness value of the population, have been met. Any given population either will meet the criteria or will not meet the criteria. If the population meets the convergence criteria, this is considered the optimal population of sensors to track the target, the final population. In this case the next step is the output of the final population step 185. Output of the final population can be accomplished in a number of different ways, including but not limited to, printing the attributes of the final population to a hard copy version, saving the attributes of the final population in an electronic format, or using the final population to control or manage some process.

If the check if the convergence criteria have been achieved step 165 shows that the population does not meet the required criteria, the next step is a mating pool selection step 170. Mating pool selection step 170 in a genetic algorithm can be accomplished in a number of ways, but is generally based in part on the fitness of the involved individuals. For example, individuals can be selected by using a biased roulette wheel, where the bias is based on the fitness of the individuals. Another method selects the mating pool based strictly on the fitness values; a certain percentage of the fittest individuals in a population are selected to mate. Yet another method uses tournament selection, first, k individuals 120 are chosen at random. Then, the fittest individuals 120 of each k-tuple is determined, and these individuals 120 are copied into the mating pool.

The next step is the creation of the offspring step 180. In this step, the parents, chosen in the selection of the mating pool step 170, are combined either with or without modification to create the next generation of offspring. Not every created member of the mating pool need be modified in the creation of the offspring step 180. Often whether or not a particular member of the mating pool is modified is determined by probabilities. These probabilities can either be specified initially or can be determined by information from the mating population or the mating pairs, for example. Modification of the offspring can be accomplished in a number of ways, called operators. Usually operators are applied with a given probability to the members of the mating pool. Generally utilized operators include, but are not limited to crossover, mutation, inversion, dominance-change, segregation and translocation, and intrachromosomal duplication. Only crossover and mutation will be explained herein.

Crossover is the process by which the genes 105 on two different chromosomes 100 are dispersed between the two chromosomes 100. One-point crossover is accomplished by randomly selecting a position, k along the chromosome 100, which is between 1 and the chromosome length less 1. Two offspring are created by switching all genes 105 between the position k+1, and the full length of the chromosome 100. There are a number of different types of crossovers, including but not limited to one-point, two-point, uniform. Crossovers can also be done on one or more chromosomes 100 of an individual 120. Generally it is done only on one chromosome, or on each chromosome.

Figure 3A:
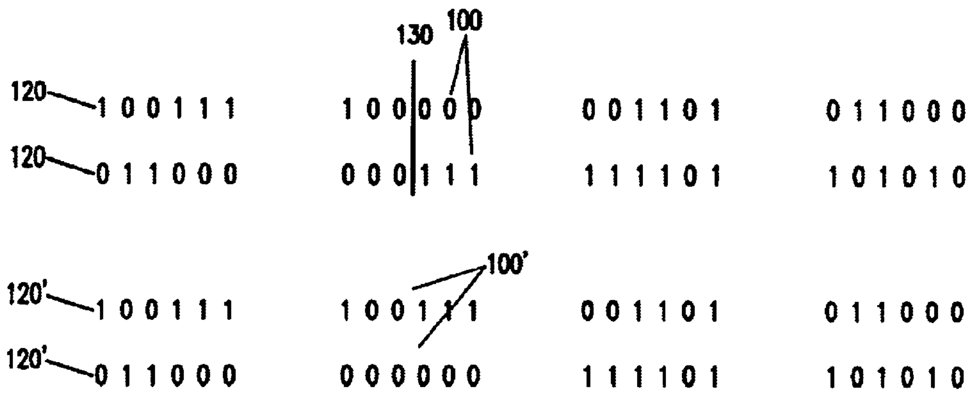
FIG. 3*a* depicts a one-point, one chromosome crossover.
Figure 3B:
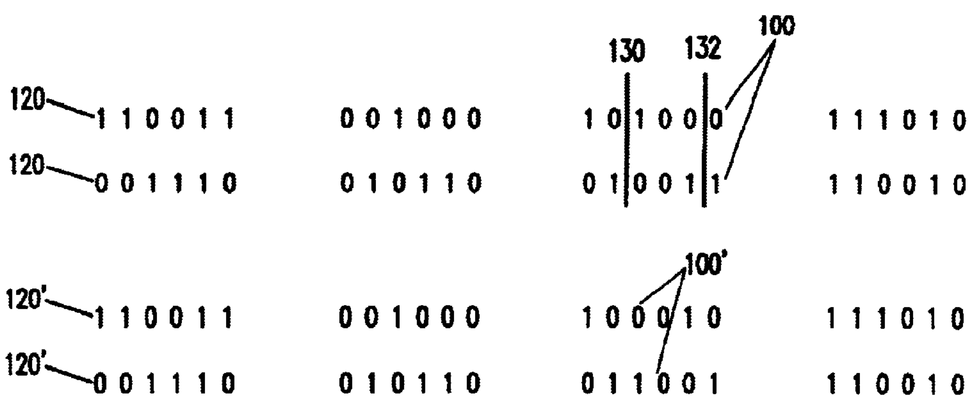
FIG. 3*b* depicts a two-point, one chromosome crossover.

FIG. 3*a* illustrates a one-point, one chromosome crossover. A crossover point 130 is chosen on the two unmodified offspring individuals 120. The alleles 110 within the gene 105 containing the crossover point 130 are switched after the crossover point 130. The genes 105 are only switched on that chromosome 100. After the crossover, modified offspring individuals 120' are created. FIG. 3*b* illustrates a two-point, one chromosome crossover. In a two-point, one chromosome crossover, a crossover point 130 and a second crossover point 132 are randomly chosen within the same chromosome 100. In this crossover, the alleles 110 within one chromosome 100 after the crossover point 130 are swapped until the second crossover point 132 is reached, at which point the alleles 110 remain the same as they were in the original chromosomes 100. Theoretically, as many crossover points as there are genes 105 could be chosen in any one chromosome.

Mutation is the process by which one or more genes 105 on a chromosome 100 are modified. Each gene 105 is chosen for mutation with a probability of mutation that is usually determined in the initialization step of a genetic algorithm. More than one gene 105 on a chromosome 100 may be mutated in one event. The probability of mutation is generally much lower than the probability of crossover. Mutation is generally thought of as a way to ensure that useful genes are not lost. Multiple mutations can occur on one or more than one chromosome 100. The number of chromosomes 100 that can have mutations occur ranges from 1 to n, where n is the number of chromosomes 100 in an individual 120.

Figure 4A:
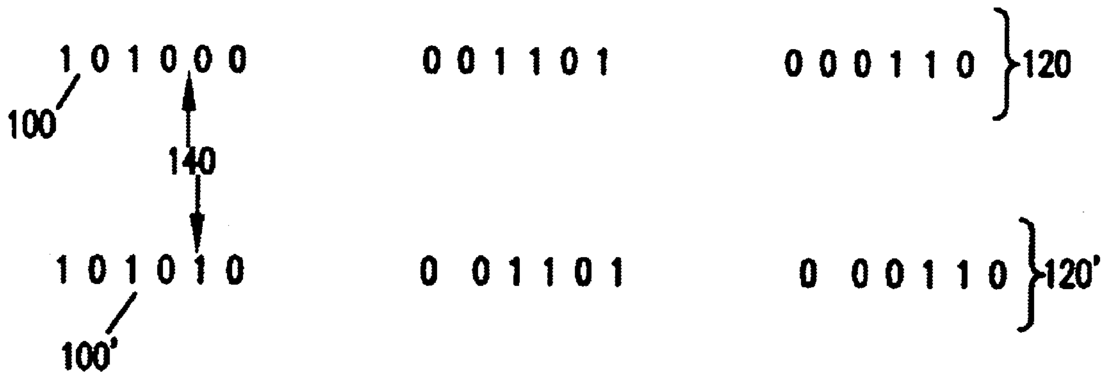
FIG. 4*a* depicts a mutation where because of the probability of mutation, only one gene was mutated.
Figure 4B:
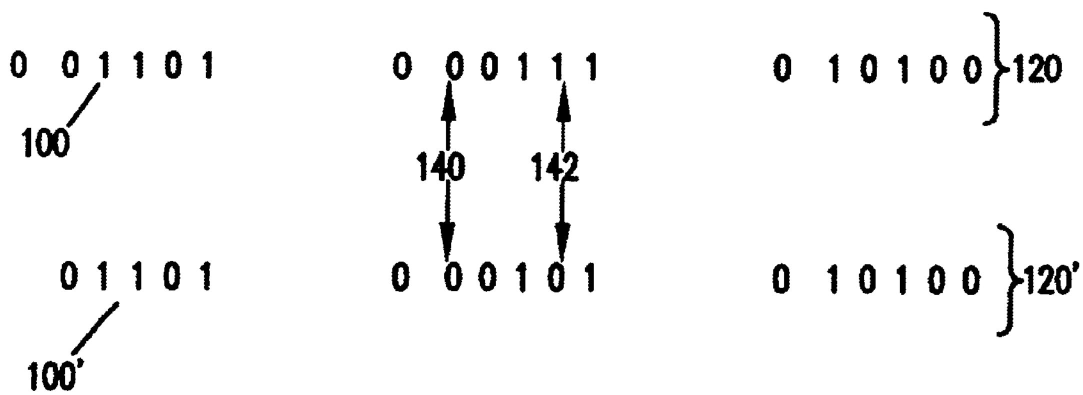
FIG. 4*b* depicts a mutation where because of the probability of mutation, two genes were mutated.

FIG. 4*a* represents a one chromosome mutation. The allele 110 at the gene 105 that occupies the mutation point 140 is then changed to some other allele 110. In a binary encoding, mutation is switching a 0 to a 1, or vice-versa. Since this is done usually with low probability, certain genes undergo mutation, and certain do not. After the creation of the offspring step 180, the determination of the fitness step 160 is repeated, followed by the check if the convergence criteria has been achieved step 165. The cycle is continued if the population does not meet the criterion. As mentioned above, if the population does meet the convergence criterion, the output step 185 is undertaken and the algorithm is complete.

Improved Genetic Algorithms

The invention includes improved genetic algorithms in order to solve multi-modal problems, such as the control and management of a sensor network. The previous discussion of basic genetic algorithms forms the basis of the improved algorithms offered herein. There are three separate improvements that the invention utilizes. These improvements can be used separately with a basic genetic algorithm, be used together with a basic genetic algorithm, be used with non-basic genetic algorithms, or some combination thereof.

The first improvement utilized in the invention is called a $C_i$ crossover. A $C_i$ crossover describes an occurrence of crossover that affects exactly i chromosomes 100 of an individual 120. Each crossover can be any type of crossover, including but not limited to, one-point, multi-point, or uniform. A one-point crossover is when a swap of genetic material, alleles 110, takes place at only one point in each affected chromosome 100. A multi-point crossover is when a swap of genetic material, alleles 110, takes place at multiple points in each affected chromosome 100 (e.g. a two point crossover performs swapping between two points in the parents). A uniform crossover is when the genes from the two parents are randomly shuffled. The value of i for a $C_i$ crossover can vary from 1 to n, where n is the number of chromosomes 100 in the individual 120. Preferably, the value of i for a $C_i$ crossover in accordance with the invention is from 2 to n−1. More preferably, the value of i for a $C_i$ crossover is 2. The preferred $C_2$ crossover of the invention can include any type of crossover, including but not limited to one-point, two-point, or uniform. Preferably, the preferred $C_2$ crossover includes one-point_type of crossovers.

Figure 5:
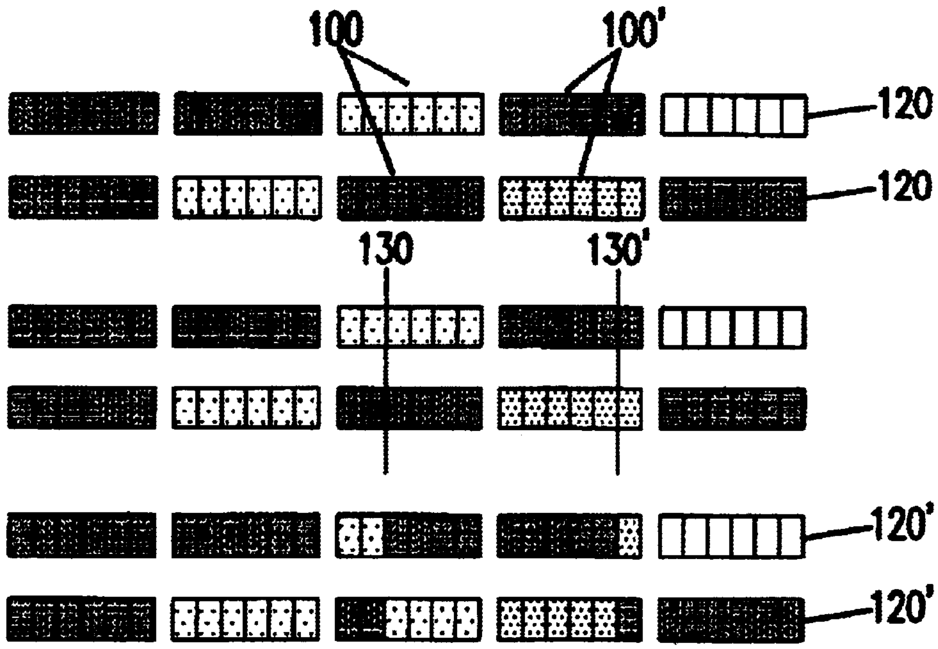
FIG. 5 depicts a one-point, $C_2$ crossover in accordance with the invention.

FIG. 5 represents a one-point, $C_2$ crossover between two individuals 120. In a one-point $C_2$ crossover, two chromosomes to undergo crossover are chosen at random from the individual. Then the same crossover point 130 is chosen randomly for both individuals 120. The alleles 110 after crossover point 130 on chromosome 100 are switched between the two individuals 120. The resulting individuals 120' are shown on the bottom of FIG. 5. Exactly two chromosomes undergo crossover.

Another improvement utilized in the invention is called a $C_i$ mutation. A $C_i$ mutation describes an occurrence of mutation that affects exactly i chromosomes 100 of an individual 120. Although there are only i chromosomes 100 affected by $C_i$ mutations, there can be more than one mutation on each chromosome 100. The number of mutations that can take place on a single chromosome 100 can range from 1 to m, where m is the number of genes 105 in a chromosome 100 (this is determined by the probability of mutation). Further, if there is more than one chromosome 100 affected by mutation (if i is greater than 1), each affected chromosome 100 can have an equal or unequal number of mutations.

The value of i for a $C_i$ mutation can vary from 1 to n, where n is the number of chromosomes 100 in the individual 120. Preferably, the value of i for a $C_i$ mutation in accordance with the invention is from 2 to n−1. More preferably, the value of i for a $C_i$ mutation is 2.

Figure 6:
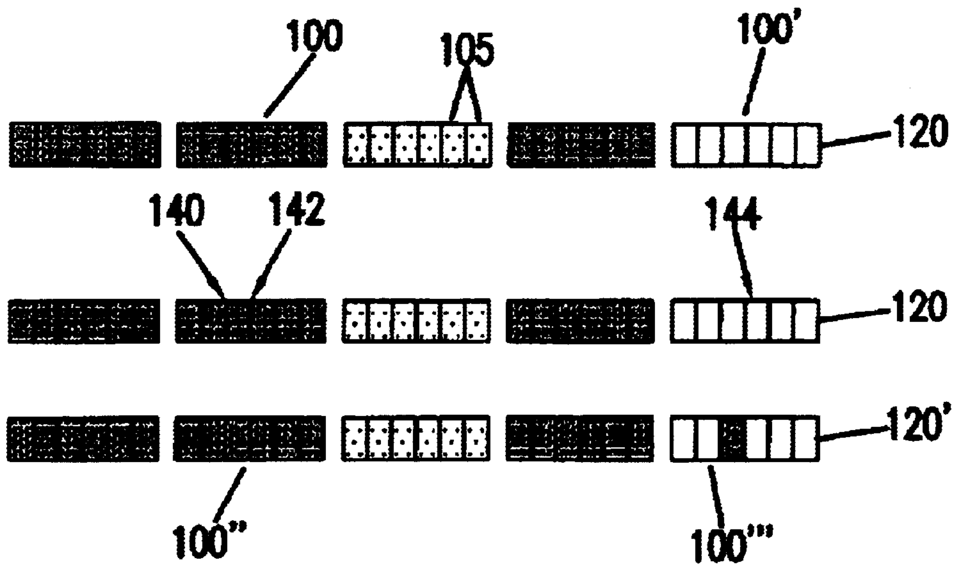
FIG. 6 depicts a $C_2$ mutation in accordance with the invention.

FIG. 6 depicts a $C_2$ mutation. The individual 120 has at least two chromosomes 100 and 100'. In this specific example of, $C_2$ mutation, two chromosomes are chosen at random for undergoing mutation. Then mutation is applied to each gene of each of the chosen chromosomes, as usual with the probability of mutation (defined in the initialization or by some other method). The alleles 110 of the genes 105 at the mutation points 140, 142, and 144 are replaced with different alleles 110. The resulting mutated chromosomes 100" and 100'" result in the mutated offspring individual 120'.

Yet another improvement utilized in genetic algorithms in accordance with the invention is an improvement in the method of choosing parents to mate in the mating step 175. Generally, both parents are chosen randomly, or both parents are chosen based on their fitness (as mentioned previously by roulette wheel selection, tournament selection, ranking selection). The improvement utilized in genetic algorithms of the invention, results in a genetic algorithm called a king genetic algorithm. In a king genetic algorithm the first parent chosen for mating is always the fittest individual 120 in the population. The fittest individual 120 in the population is determined by the specific measure of fitness used in the algorithm. This parent is used as the first mate to create each member of the next generation. The parent chosen to mate with the first parent, called the second parent, is chosen by a random method. The method used to choose the second parent can include, but is not limited to, roulette wheel selection, tournament selection, or random number generation.

This improvement is different from basic genetic algorithms in that basic genetic algorithms generally utilize the same type of method to select the two parents. For example, either both parents are chosen by roulette wheel selection or both parents are chosen by tournament selection.

Although genetic algorithms in accordance with the invention include those with any of the three improvements or combinations thereof, the preferred genetic algorithms of the invention are king genetic algorithm utilizing $C_2$ mutation, and king genetic algorithm utilizing $C_2$ crossover. The king genetic algorithm utilizing $C_2$ mutation includes the selection of the fittest individual in the population as the parent, followed by only mutations of $C_2$ type (action on only 2 chromosomes 100). Because there is only mutation (probability of crossover is zero, $P_c=0$), only one parent needs to be present, therefore the second parent is not selected. However, the number of genes 105 that can be mutated on any one chromosome 100 is not limited, and there need not be the same number of mutations on both chromosomes 100 mutated.

The second preferred genetic algorithm of the invention is a king genetic algorithm utilizing $C_2$ crossover and $C_2$ mutation. This algorithm includes the selection of the fittest individual 120 in the population as the first parent, followed by random selection of the second parent, and crossovers and mutations of only $C_2$ type (action on only 2 chromosomes). However, the number of genes 105 that can be mutated, or crossover points on any one chromosome 100 need not be limited to one. Also, the number of mutations or crossover points on the two different chromosomes 100 need not be the same.

Application of Genetic Algorithms to UGS Networks

One practical application of the genetic algorithms of the invention includes control and management of UGS networks. A description of one example of a UGS network that can be managed and controlled with a genetic algorithm in accordance with the invention follows.

An example of one such network is comprised of acoustic sensors that are capable of reporting the classification or identification of the target and a bearing angle to the target. Such a sensor network can have virtually any number of sensors. The number of sensors is determined in part by the area to be surveilled, the type of mission to be performed, the field of view and range of the sensors. Such an UGS network is generally tasked with the mission objective to detect, track and classify targets entering into the surveillance area and to minimize the combined power consumption of the sensors (i.e., prolong the network's operational life).

For example, to accurately locate a target by triangulating using bearing angle data, a set of three sensors that generates the smallest positional error for the target would be the optimal sensor set. By using cost metrics that are applicable to functions of UGS networks and an efficient optimization strategy that constrains the combinatorial search space, a large number of UGSs, acting as a network, can self-organize and manage itself optimally to accomplish remote area surveillance.

In order to determine the parameters for a genetic algorithm of the invention that is capable of controlling an exemplary UGS network, it is necessary to more fully define the tracking process. The capability to track targets anywhere, without road constraints, is a desirable attribute for a UGS network. It is therefore preferred to have an UGS network that can accomplish unconstrained tracking. Tracking is the process of determining from sensor measurements the position of all the targets in the field of view of the sensors. When dealing with acoustic, bearing only sensors, there is a need for three sensors per target, in order to perform tracking.

The goal of optimization is to select a set of sensors within the UGS network that can accomplish the tracking process with minimal errors while minimizing the cost metrics. Whereas different cost metrics could be used, a common metric that is often considered is total energy used by the sensors at each moment in time. Considering the multiple objectives (i.e., target detection, tracking, and the minimization of sensor power usage), the network has to optimize the use of its sensors for each of these objective functions in order to achieve optimal performance.

A genetic algorithm of the invention is used to select the quasi-optimal sets of sensors to optimize the objectives. This problem is considered a multi-objective optimization problem to which there is no unique solution. Furthermore, for a linearly increasing number of targets or sensors, the number of possible solutions will result in a combinatorial search space that increases exponentially. In order to select the set of sensors that provide the optimal performance, appropriate measures-of-merit or cost metrics are needed for each of the network's objectives.

Figure 7:
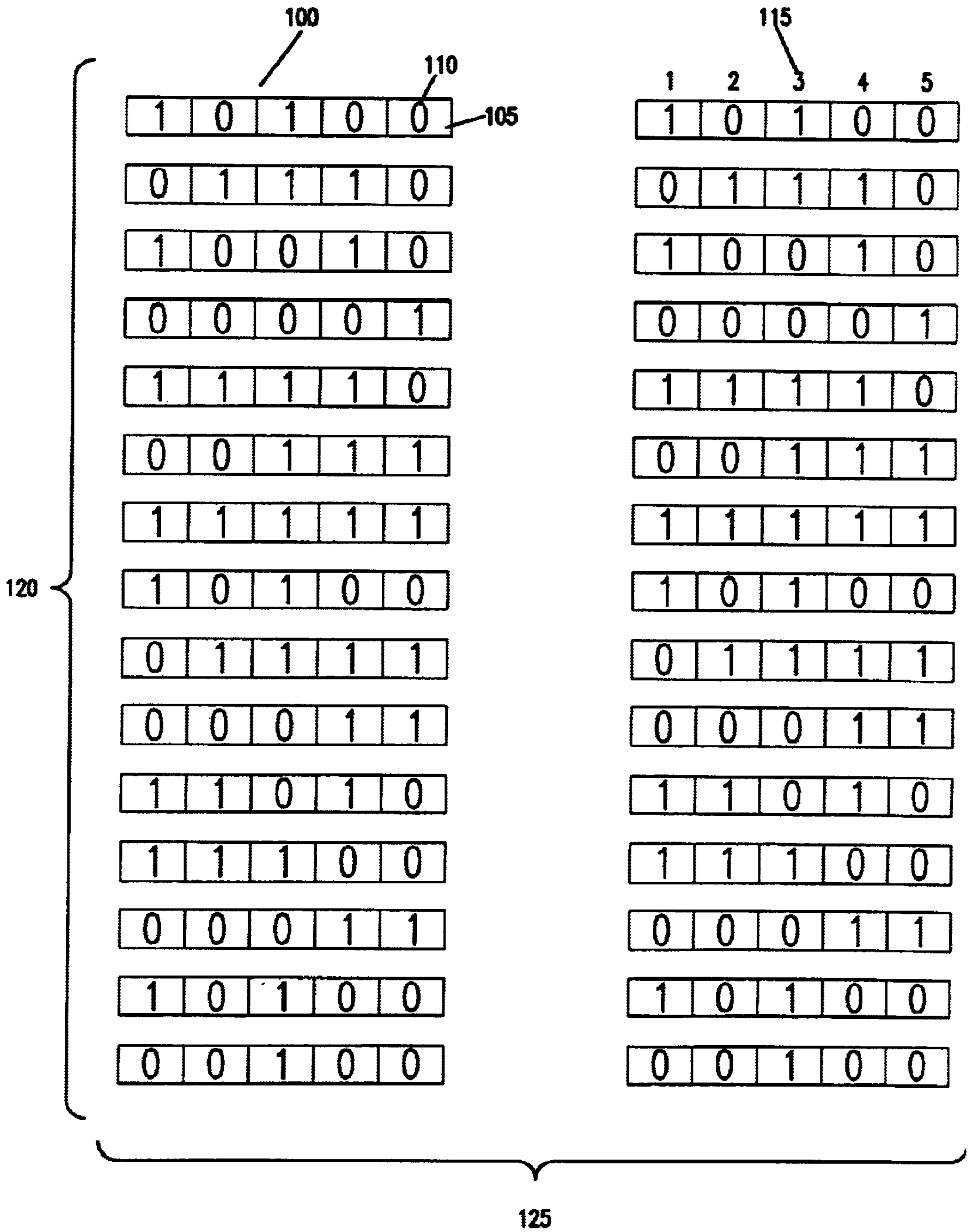
FIG. 7 depicts a construct of a genetic algorithm for use with the process of choosing optimal sensors for target tracking/identification.

The optimization of the objective function can be accomplished most efficiently with a genetic algorithm of the invention. An example of a construct under which a genetic algorithm of the invention can be used will now be explained in respect to FIG. 7. Each individual 120 of the genetic algorithm population 125 includes a number of chromosomes 100. Each chromosome 100 is made up of a number of genes 105 that constitute the identification of the sensor. All the sensors, which are chosen by the genetic algorithm to be active at any given moment, have unique, binary encoded identifications encoded in the chromosome, the alleles 110 of the genes 105. The network objective is comprised of the suspected targets and the required operations associated with the targets. For tracking, there are as many chromosomes 100 in an individual as sensors that are necessary for tracking.

As an example, assume that five (5) targets are to be tracked, and three (3) sensors are needed to track each target. Assume also that each chromosome 100 contains a sufficient number of genes 105 to have a unique binary identification of one sensor. In this scenario, each individual 120 would have 15 chromosomes 100 that represent the 15 sensors necessary to track the 5 targets. Of these 15 chromosomes 100, it is possible (and generally represents an optimal solution) to have one sensor represented more than once. If a sensor is represented more than once, it means that a given sensor is to be used for tracking more than one target. The number of individuals 120 in a population 125 depends on the particular design of the genetic algorithm.

A fitness function for use with a genetic algorithm of the invention can address any number of variables that the user desires. Examples of possible variables include, efficiency, sensor life, cost, tracking error, and speed of obtaining the information. An exemplary fitness function addresses two objectives: maximizing the accuracy of target location (i.e., minimize the position tracking error) and minimizing the network power consumption. This fitness function can be expressed as follows.

$$F = -\left(w_1 \sum_{i=1}^{n} E_i + w_2 \sum_{j=1}^{m} P_j\right)$$

where $E_i$ (i=1, 2, . . . , n) are the estimated position errors for $i^{th}$ target; $P_j$ (j=1, 2, . . . , m) are the power consumption values of the $j^{th}$ sensor; n is the number of targets; m is the total number of selected sensors, and $w_1$ and $w_2$ are two weight constants. The values of $w_1$ and $w_2$ would depend on the relative importance of minimizing errors and power consumption.

This construct for the genetic algorithm and the fitness function F, can be combined with genetic algorithms in accordance with the invention to create methods to control and manage an UGS sensor network.

WORKING EXAMPLES

The following examples provide a nonlimiting illustration of the application and benefits of the invention.

Example 1

An algorithm in accordance with the invention and algorithms not in accordance with the invention were utilized to optimize Rastringin's function. Rastringin's function is given by the equation below:

$$f_4(x_1, \ldots, x_{10}) = 200 + \Sigma(x_i^2 - 10\cos(2\pi x_i))$$

Rastringin's function was determined with 10 independent variables, and in this form is considered massively-multimodal. To solve this function using a genetic algorithm each independent variable is coded as a separate chromosome in the genetic algorithm population. Each individual is made up of ten chromosomes in this case.

The function was optimized with eight different versions of a genetic algorithm. The first was a basic genetic algorithm (GA in Table 1) that utilized both nonspecific crossovers and mutations. Next, was a basic genetic algorithm (GA_C2 in Table 1) that also used both crossovers and mutations, but crossovers were limited to $C_2$ type crossovers. After that was a basic genetic algorithm utilizing only nonspecific mutations (GA Mutation in Table 1). Then, a basic genetic algorithm using only $C_2$ mutations (GA Mutation_C2 in Table 1). Next, a king genetic algorithm using both nonspecific mutations and crossovers (King GA in Table 1). Next is a king genetic algorithm using both nonspecific mutations and $C_2$ crossovers only (King GA_C2 in Table 1). A king genetic algorithm utilizing nonspecific mutations only (King Mutation in Table 1). Lastly, a king genetic algorithm utilizing only $C_2$ mutations (King Mutation_C2 in Table 1).

The table gives the probability of crossover, $P_c$, and the probability of mutation, $P_m$, for each of the different genetic algorithms examined. The population size, and the number of generations iterated were consistent across the different algorithms examined, and were 100 and 450 respectively. The optimal number represents the number of runs where the optimal value of the function was determined. Each algorithm was ran a total of 30 times. The optimal number and the total amount of runs were utilized to calculate the effectiveness of the various algorithms, which is the percentage of the runs that converged to the global optimum.

TABLE 1

Performance of Different Genetic Algorithms in Optimizing Rastringin's Function.

| Method | Probability of crossover $P_c$ | Probability of mutation $P_m$ | Pop'n size $P_s$ | Number of Gens. | Optimal Number | Number of Runs | Effectiveness |
|---|---|---|---|---|---|---|---|
| GA | 0.9 | 0.01 | 100 | 450 | 6 | 30 | 0.20 |
| GA_C2 | 0.9 | 0.0625 | 100 | 450 | 11 | 30 | 0.37 |
| GA Mutation | 0 | 0.01 | 100 | 450 | 1 | 30 | 0.03 |
| GA Mutation_C2 | 0 | 0.0625 | 100 | 450 | 17 | 30 | 0.57 |
| King GA | 0.9 | 0.01 | 100 | 450 | 18 | 30 | 0.60 |
| King GA_C2 | 0.9 | 0.0625 | 100 | 450 | 29 | 30 | 0.97 |
| King Mutation | 0 | 0.01 | 100 | 450 | 2 | 30 | 0.07 |
| King Mutation_C2 | 0 | 0.0625 | 100 | 450 | 30 | 30 | 1.00 |

The king genetic algorithm where only $C_2$ mutations occur (King Mutation $C_2$) gave the best results of all the genetic algorithms studied. When compared to a basic genetic algorithm using none of the improvements of the invention, the effectiveness was increased fivefold.

Example 2

The best performing algorithm from Example 1 above was compared with the best of the genetic algorithms tested in K. Deb, S. Agrawal, "Understanding Interactions Among Genetic Algorithm Parameters", *Foundations of Genetic Algorithms* 5, W. Banzhaf, C. Reeves (eds.), Morgan Kaufmann Publishers, Inc., San Francisco, Calif., pp. 265–286, 1999 ("Deb").

The best genetic algorithms of Deb were tested for the optimization of Rastringin's function as given above. The population size for the king genetic algorithm using only $C_2$ mutations was 10 for both runs as compared to a population size of 1000 for the genetic algorithms in Deb. The genetic algorithm from the reference performed well only with large populations, and a population of 1000 was the best of those utilized from the reference The results of using genetic algorithms in accordance with the invention and the best of those from Deb are given in Table 2 below. The table gives the probability of crossover, $P_c$, and the probability of mutation, $P_m$, for each of the different genetic algorithms examined. The population size, and the number of generations iterated are also given in the table and can be seen not to be consistent across the different algorithms examined. The important factor is the number of fitness function evaluations performed by each algorithm. This value is obtained by multiplying the population size by the number of generations. This value is important because of the nominal amount of time that each such calculation takes. The smaller number of times the fitness function has to be evaluated, the faster a function can be optimized.

The optimal number represents the number of runs where the optimal value of the function was obtained. The number of runs was also different for genetic algorithms in accordance with the invention and those from Deb. The effectiveness is then calculated based on the number of optimal runs. The table also displays the number of times the function had to be evaluated ("No. of function evals."), which was utilized to calculate the time savings of the two algorithms in accordance with the invention over the best algorithm from Deb.

TABLE 2

Performance of King Mutation C2 and Deb Algorithm in Optimizing Rastringin's Function.

| Method | $P_c$ | $P_m$ | Pop'n size | No. of Gens | Opt. No. | No. of Runs | Eff. | No. of function evals. | Time savings |
|---|---|---|---|---|---|---|---|---|---|
| King Mutation C2 | 0 | 0.1 | 10 | 1000 | 24 | 30 | 0.80 | 10000 | 64.2% |
| King Mutation C2 | 0 | 0.1 | 10 | 2000 | 30 | 30 | 1.00 | 20000 | 28.3% |
| Best results from Deb | 0.9 | 0 | 1000 | 45 | 45 | 50 | 0.90 | 27900 | 0.00% |

Example 3

In this example, genetic algorithms of the invention were compared with basic genetic algorithm for a "deceptive function". The function that was optimized in this example was the unitation function. The unitation function is a function whose value depends only upon the number of ones and zeroes in the string on which it acts. The unitation function u computes the number of ones in a string. The deceptive function that was optimized in this example has then following mathematical expression:

$$f_5 = \sum_{i=1}^{10} g(u_i)$$

where u is the unitation function.

Values of function g(u) for values of unitation function u from 0 to 4 are given below in Table 3.

TABLE 3

Values of g(u) for values of u of 0 to 4

| u | 0 | 1 | 2 | 3 | 4 |
|---|---|---|---|---|---|
| g(u) | 3 | 2 | 1 | 0 | 4 |

So, for a four bit string, the results of g(u) are as given in Table 4 below:

TABLE 4

Values of g(u) for four bit strings

| String (4 bits) | u | g(u) |
|---|---|---|
| 0000 | 0 | 3 |
| 0001 | 1 | 2 |
| 0010 | 1 | 2 |
| 0100 | 1 | 2 |
| 1000 | 1 | 2 |
| 0011 | 2 | 1 |
| 0101 | 2 | 1 |
| 0110 | 2 | 1 |
| 1010 | 2 | 1 |
| 1100 | 2 | 1 |
| 0111 | 3 | 0 |
| 1011 | 3 | 0 |
| 1101 | 3 | 0 |
| 1110 | 3 | 0 |
| 1111 | 4 | 4 |

$f_5$ is a difficult to solve function, since the low-order building blocks corresponding to the deceptive attractor (string of all zeros) are better than those of the global attractor (string of all ones).

The genetic algorithms that were examined include the same 8 variations that were examined in Example 1 above, and include the following. The first was a basic genetic algorithm (GA in Table 5 below) that utilized both nonspecific crossovers and mutations. Next, was a basic genetic algorithm (GA_C2 in Table 5) that also used both crossovers and mutations, but crossovers were limited to $C_2$ type crossovers. After that a basic genetic algorithm utilizing only nonspecific mutations (GA Mutation in Table 5) was utilized. Then a basic genetic algorithm using only $C_2$ mutations (GA Mutation_C2 in Table 5)was examined. Next, was a king genetic algorithm using both nonspecific mutations and crossovers (King GA in Table 5). Then, a king genetic algorithm using both nonspecific mutations and $C_2$ crossovers only (King GA_C2 in Table 5) was examined. A king genetic algorithm utilizing nonspecific mutations only (King Mutation in Table 5) was next. Last was a king genetic algorithm utilizing only $C_2$ mutations (King Mutation_C2 in Table 5).

The results for these comparisons are seen in Table 5 below. The table gives the probability of crossover, $P_c$, and the probability of mutation, $P_m$, for each of the different genetic algorithms examined. The population size, and the number of generations gone through were consistent across the different methods examined, and were 100 and 450 respectively. The optimal number represents the number of runs where the optimal value of the function was determined. Each algorithm was ran a total of 30 times. The optimal number and the total amount of runs were utilized to calculate the efficiency of the various algorithms.

TABLE 5

Performance of Different Genetic Algorithms Improvements of the Invention in Optimization of a Deceptive Function

| Method | Probability of crossover $P_c$ | Probability of mutation $P_m$ | Pop'n size $P_s$ | Number of Gens. | Optimal Number | Number of Runs | Effective-ness |
|---|---|---|---|---|---|---|---|
| GA | 0.9 | 0.025 | 100 | 150 | 0 | 30 | 0.00 |
| GA_C2 | 0.9 | 0.25 | 100 | 150 | 1 | 30 | 0.03 |
| GA Mutation | 0 | 0.025 | 100 | 150 | 0 | 30 | 0.00 |
| GA Mutation_C2 | 0 | 0.25 | 100 | 150 | 6 | 30 | 0.20 |
| King GA | 0.9 | 0.025 | 100 | 150 | 0 | 30 | 0.00 |
| King GA_C2 | 0.9 | 0.25 | 100 | 150 | 22 | 30 | 0.73 |
| King Mutation | 0 | 0.025 | 100 | 150 | 0 | 30 | 0.00 |
| King MutationC2 | 0 | 0.25 | 100 | 150 | 29 | 30 | 0.97 |

King Mutation C2 achieves a very high effectiveness of 0.97 compared with the basic GA result of 0.0.

Example 4

Genetic algorithms of the invention were compared with basic genetic algorithms for optimization of a sensor test function for tracking 7 targets.

The sensor network that was simulated in this example is comprised of acoustic sensors that are capable of reporting the classification or identification of the target and a bearing angle to the target. This simulated sensor network has 181 sensors each having a 360° FOV (field of view), with a 4 km radius and are randomly distributed over a 625 $km^2$ surveillance area.

The mission objectives of the network are to detect, track, and classify targets entering the surveillance area and to minimize the combined power consumption of the sensors (i.e., prolong the network's operational life). For example, to accurately locate a target by triangulating using bearing angle data, a set of three sensors that generates the smallest positional error for the target at the lowest combined power consumption would be the optimal sensor set. It is necessary to have some particular weighting of these two factors in order to determine an objective function that can be optimized.

Figure 8:
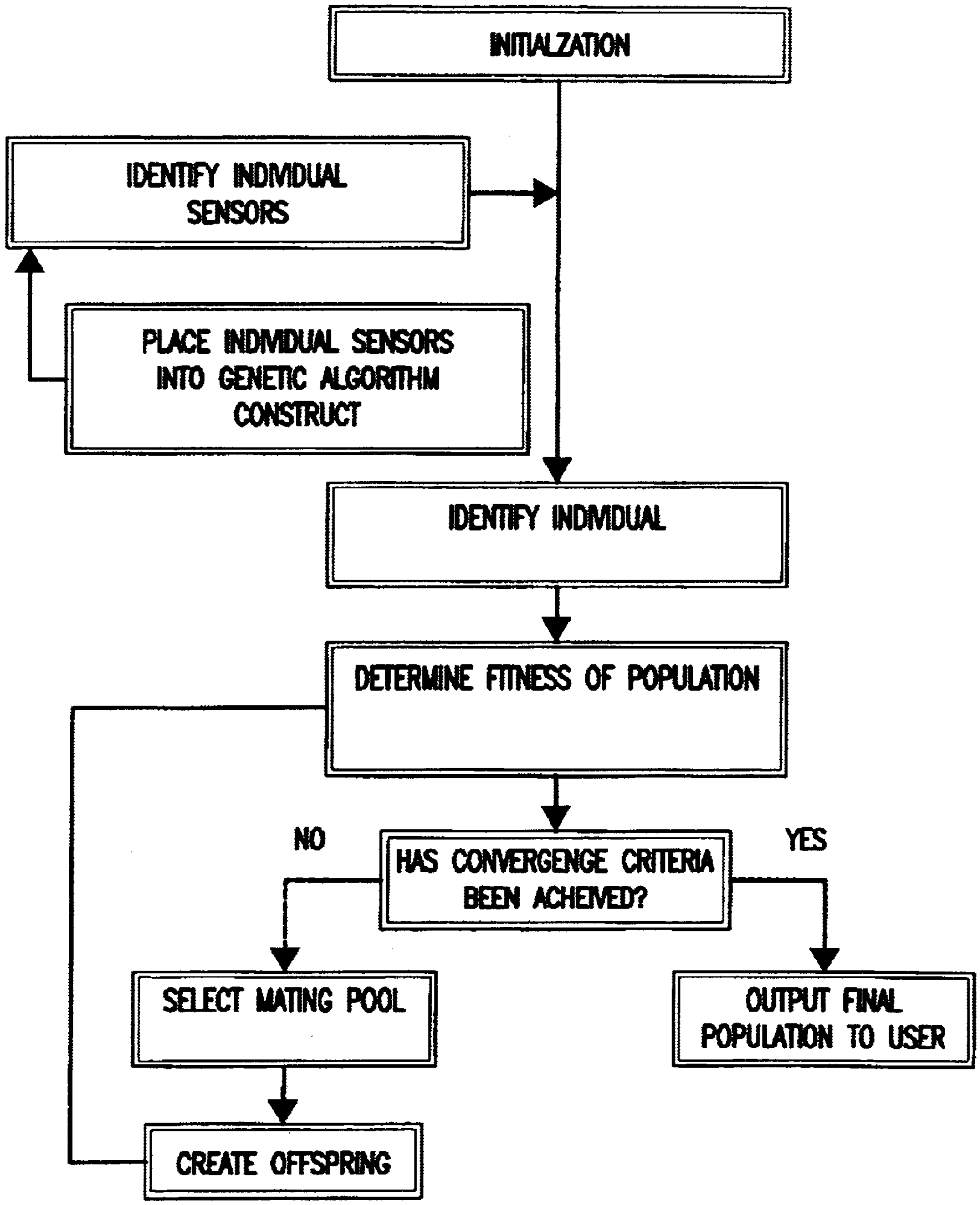
FIG. 8 depicts a generalized flow chart representing a method in accordance with one aspect of the invention for controlling and managing a sensor network.

Since for each of the seven targets, there is a need to find three sensors, each individual in the genetic algorithm is composed of 7*3=21 chromosomes. Each chromosome contains the identification number of one sensor. The genetic algorithm that was used was analogous to that depicted in FIG. 8.

The fitness function for use with this genetic algorithm construct addresses two objectives: maximizing the accuracy of target location (i.e., minimize the position tracking error) and minimizing the network power consumption. This fitness function can be expressed as follows.

$$F=-\left(w_1\sum_{i=1}^{n}E_i+w_2\sum_{j=1}^{m}P_j\right)$$

where $E_i$ (i=1, 2, . . . , n) are the estimated position errors for $i^{th}$ target; $P_j$ (j=1, 2, . . . , m) are the power consumption values of the $j^{th}$ sensor; n is the number of targets; m is the total number of selected sensors, and $w_1$ and $w_2$ are two weight constants. The values of $w_1$ and $w_2$ would depend on the relative importance of minimizing errors and power consumption.

The genetic algorithms were then evaluated using simulated acoustic sensor measurement data. The simulated data contained sensor location, bearing angle measurements and target identification data from each sensor. Movement trajectories were simulated for seven targets belonging to the class of tracked vehicles. Those targets were in the same neighborhood, meaning that the optimal sensor choice would be the one in which certain sensors are shared.

TABLE 6

Performance of Different Generic Algorithms for Optimization of Fitness Function for Seven (7) Targets.

| Method | $P_c$ | $P_m$ | Pop'n size | No. of Gens. wt change | No. of Gens. run | Optimal No. | No. of runs | Effective-ness | Mean Best Fitness |
|---|---|---|---|---|---|---|---|---|---|
| GA | 0.9 | 0.01 | 10 | 2000 | 4492 | 3 | 20 | 0.15 | −773.4 |
| GA_C2 | 0.9 | 0.1 | 10 | 2000 | 3608 | 8 | 20 | 0.40 | −714.2 |
| GA Mutation | 0 | 0.01 | 10 | 2000 | 4655 | 7 | 20 | 0.35 | −679.9 |

TABLE 6-continued

Performance of Different Generic Algorithms for Optimization of Fitness Function for Seven (7) Targets.

| Method | $P_c$ | $P_m$ | Pop'n size | No. of Gens. wt change | No. of Gens. run | Optimal No. | No. of runs | Effective-ness | Mean Best Fitness |
|---|---|---|---|---|---|---|---|---|---|
| GA Mutation C2 | 0 | 0.1 | 10 | 2000 | 3524 | 8 | 20 | 0.40 | −660.7 |
| King GA | 0.9 | 0.01 | 10 | 2000 | 4138 | 6 | 20 | 0.30 | −675.4 |
| King GA C2 | 0.9 | 0.1 | 10 | 2000 | 3764 | 14 | 20 | 0.70 | −576.9 |
| King Mutation | 0 | 0.01 | 10 | 2000 | 3270 | 9 | 20 | 0.45 | −647.2 |
| King Mutation C2 | 0 | 0.1 | 10 | 2000 | 3299 | 14 | 20 | 0.70 | −599.0 |

Figure 9:
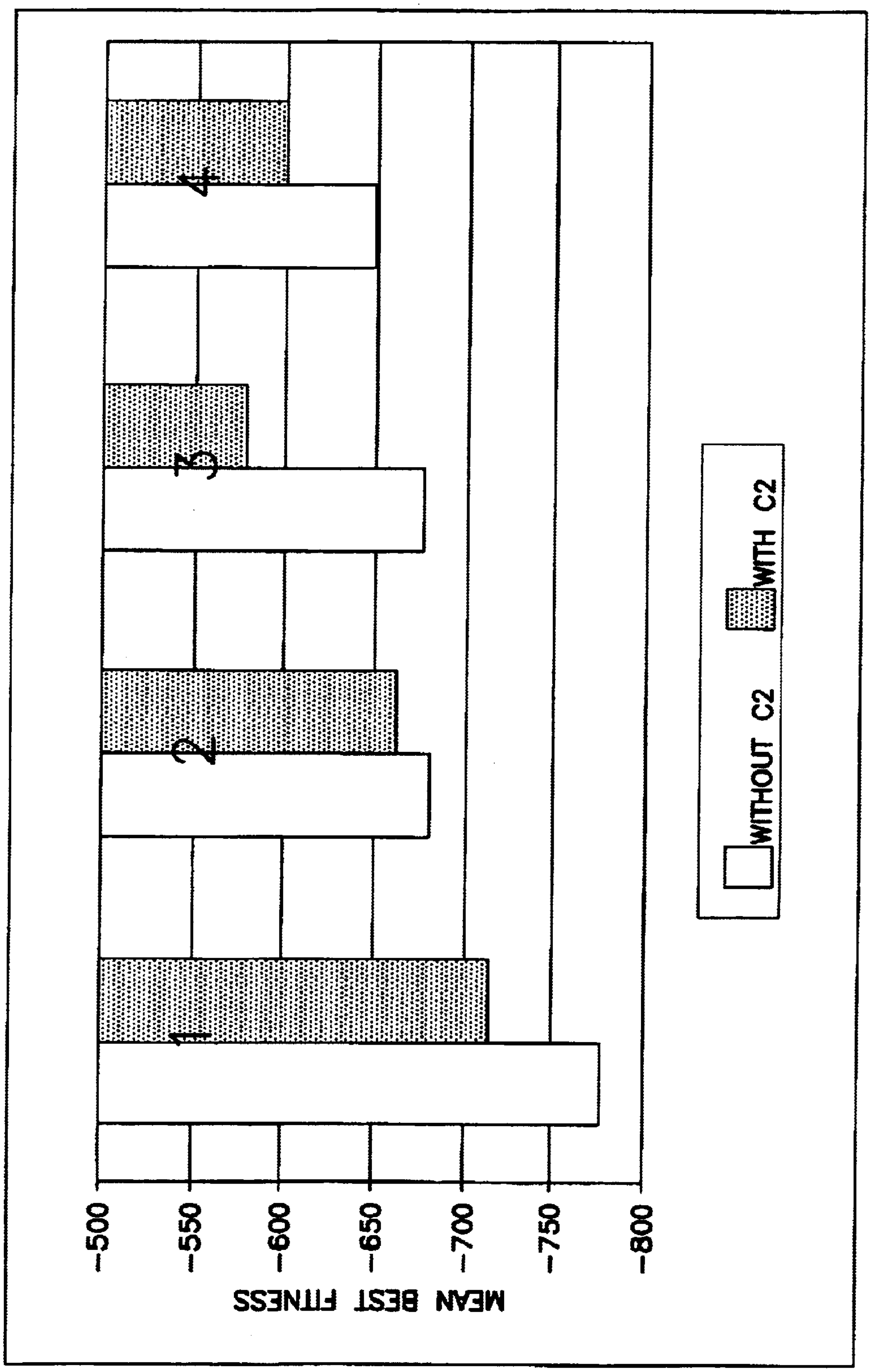
FIG. 9 depicts the mean best fitness for the performance of eight algorithms in optimizing sensor control.

FIG. 9 is a graph depicting the mean best fitness for the different algorithms used. It can be seen that irregardless of the genetic algorithm used, those utilizing only $C_2$ cross-overs or mutations always function better.

Figure 10:
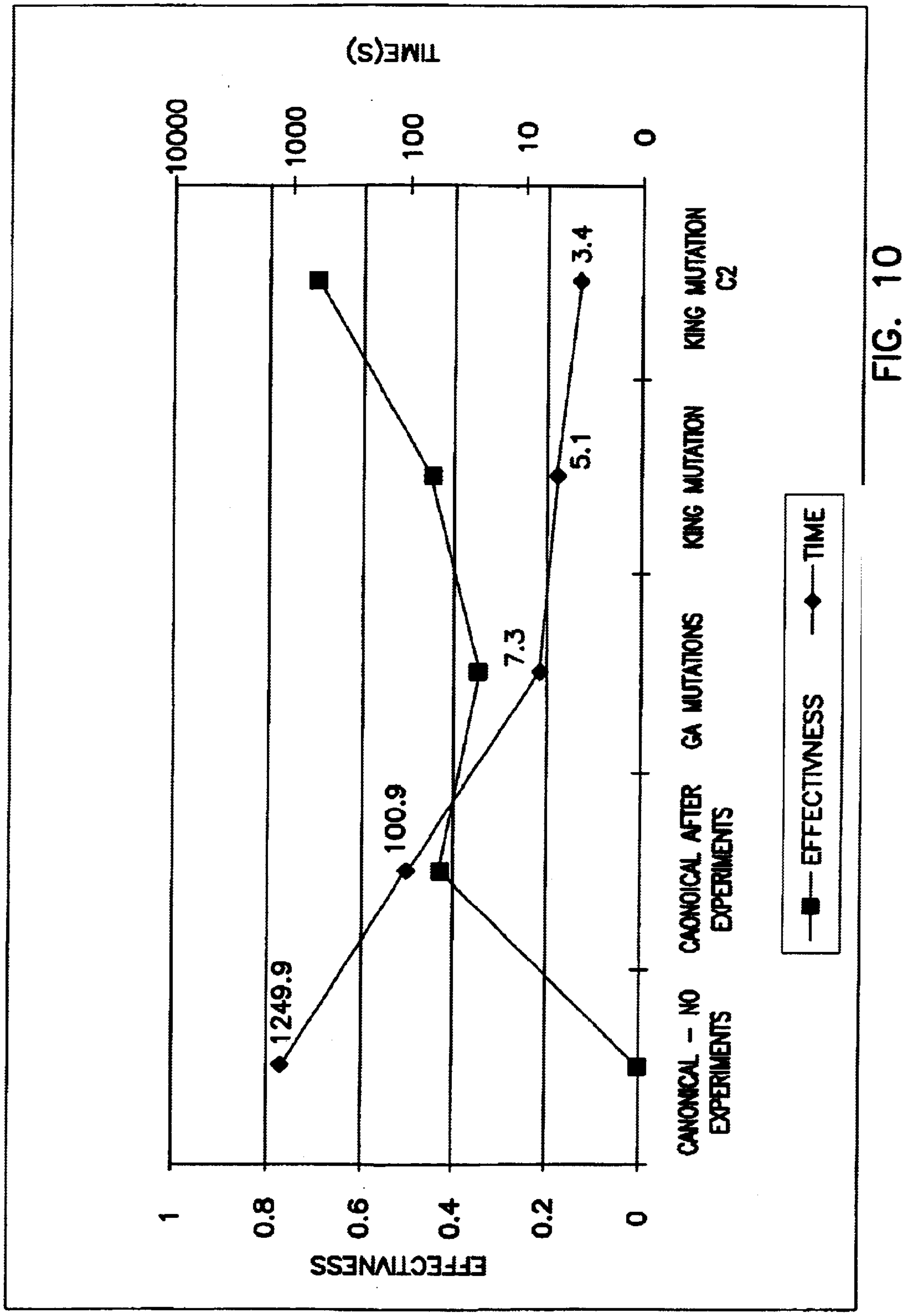
FIG. 10 depicts the effectiveness and time necessary for optimization for five of the algorithms represented in FIG. 9.

FIG. 10 compares the effectiveness and necessary time for five of the different genetic algorithms examined in Table 6. The methods represented in FIG. 10 include a basic genetic algorithm with no experimentation and a population size of 50, a basic genetic algorithm after experimentation (smaller population sizes gave better effectiveness), a basic genetic algorithm utilizing only mutation, a king genetic algorithm utilizing only mutation, and a king genetic algorithm utilizing only $C_2$ type mutations.

Figure 11:
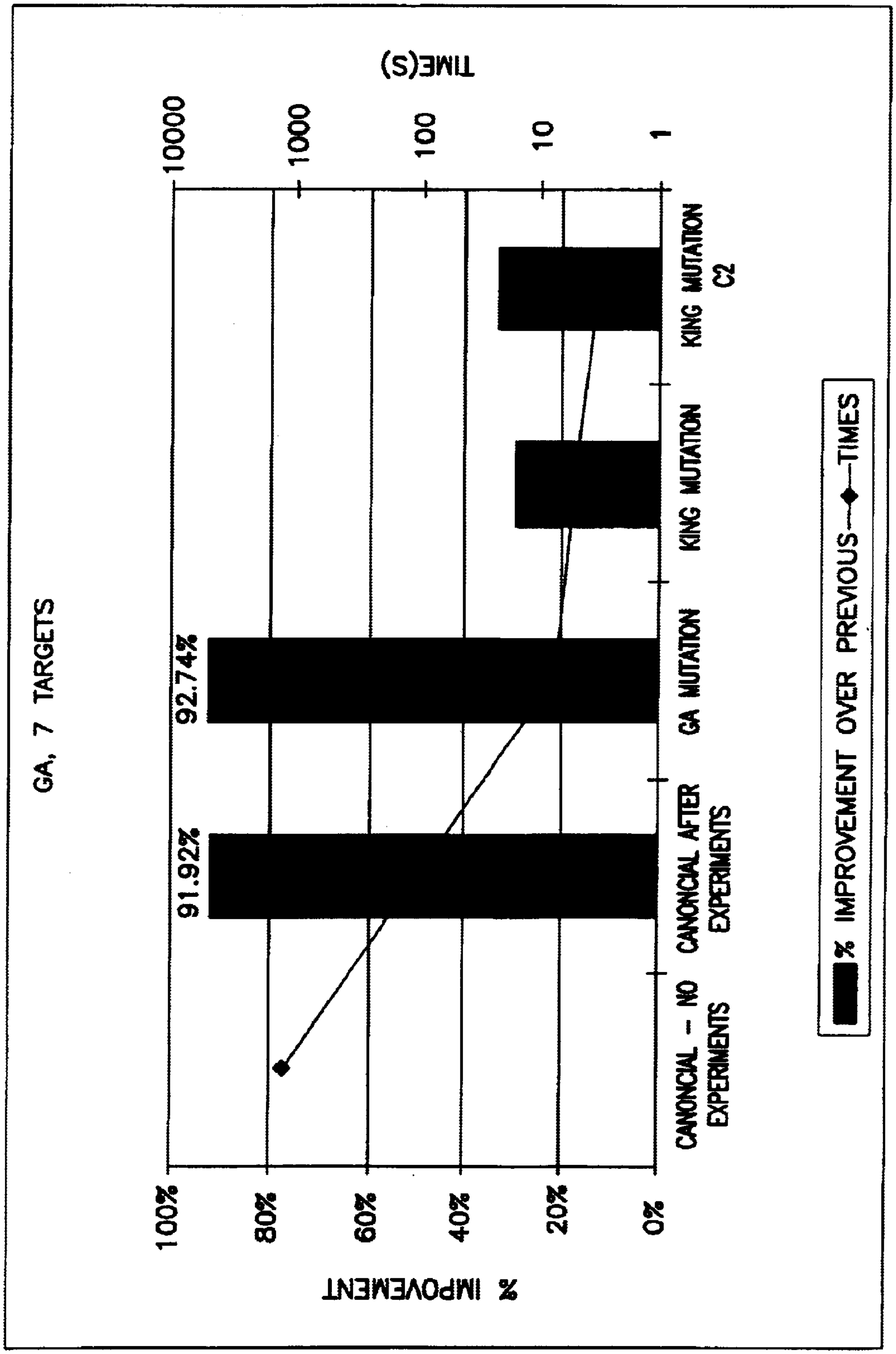
FIG. 11 depicts the percent improvement over time for the five algorithms depicted in FIG. 10.

FIG. 11 depicts the percent improvement over time for the same five genetic algorithm variations that were depicted in FIG. 10 above.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer implemented method for selecting sensors from a sensor network for tracking of at least one target comprising the steps of:

(a) defining an individual of a genetic algorithm construct having n chromosomes, wherein each chromosome represents one sensor;

(b) defining a fitness function based on desired attributes of the tracking;

(c) selecting one or more of said individuals for inclusion in an initial; and (d) executing a genetic algorithm on said population until defined convergence criteria are met, wherein execution of said genetic algorithm comprises the steps of:

(i) choosing the fittest individual from said population;

(ii) choosing random individuals from said population; and (iii) creating offspring from said fittest and said randomly chosen individuals.

2. The method of claim 1, wherein said chromosomes representing said sensors comprise a binary or real number identification of said sensors.

3. The method of claim 1, further comprising defining an individual as comprising n chromosomes, wherein n is the number of sensors necessary to track said target multiplied by the number of said targets to be tracked.

4. The method of claim 1, wherein said desired attributes of step (b) comprise minimal power consumption.

5. The method of claim 1, wherein said desired attributes of step (b) comprise minimal tracking error.

6. The method of claim 1, wherein said desired attributes of step (b) comprise minimal power consumption and minimal tracking error.

7. The method of claim 6, wherein said fitness function of step (b) comprises the formula:

$$F = -\left(w_1 \sum_{i=1}^{n} E_i + w_2 \sum_{j=1}^{m} P_j\right),$$

wherein $E_i$ (i=1,2, . . . ,k) are the estimated position errors for tracking $i^{th}$ target, wherein Pj (j=1,2, . . . ,m) are the power consumption values of the $j^{th}$ sensor; k is the number of targets; m is the total number of selected sensors, and $w_1$ and $w_2$ are two weight constants.

8. The method of claim 1, wherein said initial selection of said individuals in step (c) is accomplished by a random method.

9. The method of claim 1, wherein said convergence criteria of step (d) comprises a specified number of generations.

10. The method of claim 1, wherein said convergence criteria of step (d) comprises a specified number of generations after which no improvement is seen in the fittest individual in said population.

11. The method of claim 1, wherein said fittest individual of said population in step (d) is chosen based on said fitness function.

12. The method of claim 1, wherein said random individuals from said population in step (d) are chosen by roulette wheel selection, tournament selection, random number generation, or a combination thereof.

13. The method of claim 1, wherein said creation of said offspring in step (d) is accomplished by mutation, crossover, or combinations thereof.

14. The method of claim 13, wherein said creation of said offspring in step (d) occur through mutation, crossover, or a combination thereof, and only i chromosomes are affected during any one mutation or crossover, wherein i has a value of from 2 to n−1.

15. The method of claim 14, wherein i has a value of 2.

16. A computer implemented method for selecting sensors from a sensor network for tracking of at least one target comprising the steps of:

(a) defining an individual of a genetic algorithm construct having n chromosomes, wherein each chromosome represents one sensor;

(b) defining a fitness function based on desired attributes of the tracking;

(c) selecting one or more of said individuals for inclusion in an initial population; and (d) executing a genetic algorithm on said population until defined convergence criteria are met, wherein execution of said genetic algorithm comprises the steps of:

(i) choosing the fittest individual from said population; and (ii) creating offspring from said fittest individual wherein said creation of said offspring occurs through mutation only, wherein only i chromosomes are mutated in one individual, and wherein i has a value of from 2 to n−1.

17. The method of claim 16, wherein said chromosomes representing said sensors comprise a binary or real number identification of said sensors.

18. The method of claim 16, further comprising defining an individual as comprising n chromosomes, wherein n is the number of sensors necessary to track said target multiplied by the number of said targets to be tracked.

19. The method of claim 16, wherein said desired attributes of step (b) comprise minimal power consumption.

20. The method of claim 16, wherein said desired attributes of step (b) comprise minimal tracking error.

21. The method of claim 16, wherein said desired attributes of step (b) comprise minimal power consumption and minimal tracking error.

22. The method of claim 21, wherein said fitness function of step (b) comprises the formula:

$$F = -\left(w_1 \sum_{i=1}^{n} E_i + w_2 \sum_{j=1}^{m} P_j\right),$$

wherein $E_i$ (i=1,2, . . . ,k) are the estimated position errors for tracking $i^{th}$ target, wherein Pj (j=1,2, . . . ,m) are the power consumption values of the $j^{th}$ sensor; k is the number of targets; m is the total number of selected sensors, and $w_1$ and $w_2$ are two weight constants.

23. The method of claim 16, wherein said initial selection of said individuals in step (c) is accomplished by a random method.

24. The method of claim 16, wherein said convergence criteria of step (d) comprises a specified number of generations.

25. The method of claim 16, wherein said convergence criteria of step (d) comprises a specified number of generations after which no improvement is seen in the fittest individual in said population.

26. The method of claim 16, wherein i has a value of 2.

27. A computer implemented method for selecting sensors from a sensor network for tracking of a target comprising the steps of:

(a) defining an individual of a genetic algorithm construct having n chromosomes, wherein each chromosome represents one sensor, wherein n=k*y where k is the number of targets to be tracked and y is the number of sensors needed to track one target;

(b) defining a fitness function based on power consumption of said sensors and tracking errors made by said sensors;

(c) randomly selecting one or more of said individuals for inclusion in an initial population;

(d) executing a genetic algorithm on said initial population until defined convergence criteria are meet, wherein said convergence criteria are based on number of generations iterated in said genetic algorithm, wherein execution of said genetic algorithm comprises the steps of:

(i) choosing the fittest individual, based on said fitness function from said population; and (ii) creating offspring from said fittest individual, wherein said creation of said offspring occurs through mutation only, and wherein only 2 chromosomes are mutated in one individual; and (e) selecting sensors based on said individuals comprising the population that exists at the time when said defined convergence criteria are met.

28. A network of sensors for tracking objects comprising:

(A) N sensors;

(B) a controller capable of controlling and managing said N sensors, wherein said controller selects sensors from a sensor network for tracking of a target by carrying out a method comprising the following steps:

(i) defining an individual of a genetic algorithm construct having n chromosomes, wherein each chromosome represents one sensor;

(ii) defining a fitness function based on desired attributes of the tracking;

(iii) selecting one or more of said individuals for inclusion in an initial population; and (iv) executing a genetic algorithm on said population until defined convergence criteria are met, wherein execution of said genetic algorithm comprises the steps of:

(a) choosing the fittest individual from said population;

(b) choosing random individuals from said population; and (c) creating offspring from said first and said randomly chosen individuals; and (C) a means for said individual sensors and said controller to communicate.

29. The network of sensors of claim 28, wherein said chromosomes representing said sensors comprise a binary or real number identification of said sensors.

30. The network of sensors of claim 28, further comprising defining an individual as comprising n chromosomes, wherein n is the number of sensors necessary to track said target multiplied by the number of said targets to be tracked.

31. The network of sensors of claim 28, wherein said desired attributes of step (b) comprise minimal power consumption.

32. The network of sensors of claim 28, wherein said desired attributes of step (b) comprise minimal tracking error.

33. The network of sensors of claim 28, wherein said desired attributes of step (ii) comprise minimal power consumption and minimal tracking error.

34. The network of sensors of claim 33, wherein said fitness function of step (ii) comprises the formula:

$$F = -\left(w_1 \sum_{i=1}^{n} E_i + w_2 \sum_{j=1}^{m} P_j\right),$$

wherein $E_i$ (i=1,2, . . . , k) are the estimated position errors for tracking $i^{th}$ target, wherein Pj (j=1,2, . . . ,m) are the power consumption values of the $j^{th}$ sensor; k is the number of targets; m is the total number of selected sensors, and $w_1$ and $w_2$ are two weight constants.

35. The network of sensors of claim 28, wherein said initial selection of said individuals in step (c) is accomplished by a random method.

36. The network of sensors of claim 28, wherein said convergence criteria of step (d) comprises a specified number of generations.

37. The network of sensors of claim 28, wherein said convergence criteria of step (d) comprises a specified number of generations after which no improvement is seen in the fittest individual in said population.

38. The network of sensors of claim 28, wherein said fittest individual of said population in step (d) is chosen based on said fitness function.

39. The network of sensors of claim 28, wherein said random individuals from said population in step (d) are chosen by roulette wheel selection, tournament selection, random number generation, or a combination thereof.

40. The network of sensors of claim 28, wherein said creation of said offspring in step (d) is accomplished by mutation, crossover, or combinations thereof.

41. The network of sensors of claim 28, wherein said creation of said offspring in step (d) occur through mutation, crossover, or a combination thereof, and only i chromosomes are affected during any one mutation or crossover, wherein i has a value of from 2 to n−1.

42. The network of sensors of claim 28, wherein i has a value of 2.

43. A network of sensors for tracking objects comprising:

(A) N sensors;

(B) a controller capable of controlling and managing said N sensors, wherein said controller selects sensors from a sensor network for tracking of a target by carrying out a method comprising the following steps:

(i) defining an individual of a genetic algorithm construct having n chromosomes, wherein each chromosome represents one sensor;

(ii) defining a fitness function based on desired attributes of the tracking;

(iii) selecting one or more of said individuals for inclusion in an initial population; and (iv) executing a genetic algorithm on said population until defined convergence criteria are met, wherein execution of said genetic algorithm comprises the steps of:

(a) choosing the fittest individual from said population; and (b) creating offspring from said fittest individual wherein said creation of said offspring occurs through mutation only, wherein only i chromosomes are mutated during any one mutation, and wherein i has a value of from 2 to n−1; and (C) a means for said individual sensors and said controller to communicate.

44. The network of sensors of claim 43, wherein said chromosomes representing said sensors comprise a binary or real number identification of said sensors.

45. The network of sensors of claim 43, further comprising defining an individual as comprising n chromosomes, wherein n is the number of sensors necessary to track said target multiplied by the number of said targets to be tracked.

46. The network of sensors of claim 43, wherein said desired attributes of step (ii) comprise minimal power consumption.

47. The network of sensors of claim 43, wherein said desired attributes of step (ii) comprise minimal tracking error.

48. The network of sensors of claim 43, wherein said desired attributes of step (ii) comprise minimal power consumption and minimal tracking error.

49. The network of sensors of claim 48, wherein said fitness function of step (ii) comprises the formula:

$$F = -\left(w_1 \sum_{i=1}^{n} E_i + w_2 \sum_{j=1}^{m} P_j\right),$$

wherein $E_i$ (i=1,2, . . . ,k) are the estimated position errors for tracking $i^{th}$ target, wherein Pj (j=1,2, . . . ,m) are the power consumption values of the $j^{th}$ sensor; k is the number of targets; m is the total number of selected sensors, and $w_1$ and $w_2$ are two weight constants.

50. The network of sensors of claim 43, wherein said initial selection of said individuals in step (c) is accomplished by a random method.

51. The network of sensors of claim 43, wherein said convergence criteria of step (d) comprises a specified number of generations.

52. The network of sensors of claim 43, wherein said convergence criteria of step (d) comprises a specified number of generations after which no improvement is seen in the fittest individual in said population.

53. The network of sensors of claim 43, wherein i has a value of 2.

54. A network of sensors for tracking objects comprising:

(A) N sensors;

(B) a controller capable of controlling and managing said N sensors, wherein said controller selects sensors from a sensor network for tracking of a target by carrying out a method comprising the following steps:

(i) defining an individual of a genetic algorithm construct having n chromosomes, wherein each chromosome represents one sensor, wherein n=k*y where k is the number of targets to be tracked and y is the number of sensors needed to track one target;

(ii) defining a fitness function based on power consumption of said sensors and tracking errors made by said sensors;

(iii) randomly selecting one or more of said individuals for inclusion in an initial population;

(iv) executing a genetic algorithm on said initial population until defined convergence criteria are meet, wherein said convergence criteria are based on number of generations iterated in said genetic algorithm, wherein execution of said genetic algorithm comprises the steps of:

(a) choosing the fittest individual, based on said fitness function from said population; and (b) creating offspring from said fittest individual, wherein said creation of said offspring occurs through mutation only, and wherein only 2 chromosomes are mutated during any one mutation; and (v) selecting sensors based on said individuals comprising the population that exists at the time when said defined convergence criteria are met; and (C) a means for said individual sensors and said controller to communicate.

* * * * *